Figure 1:
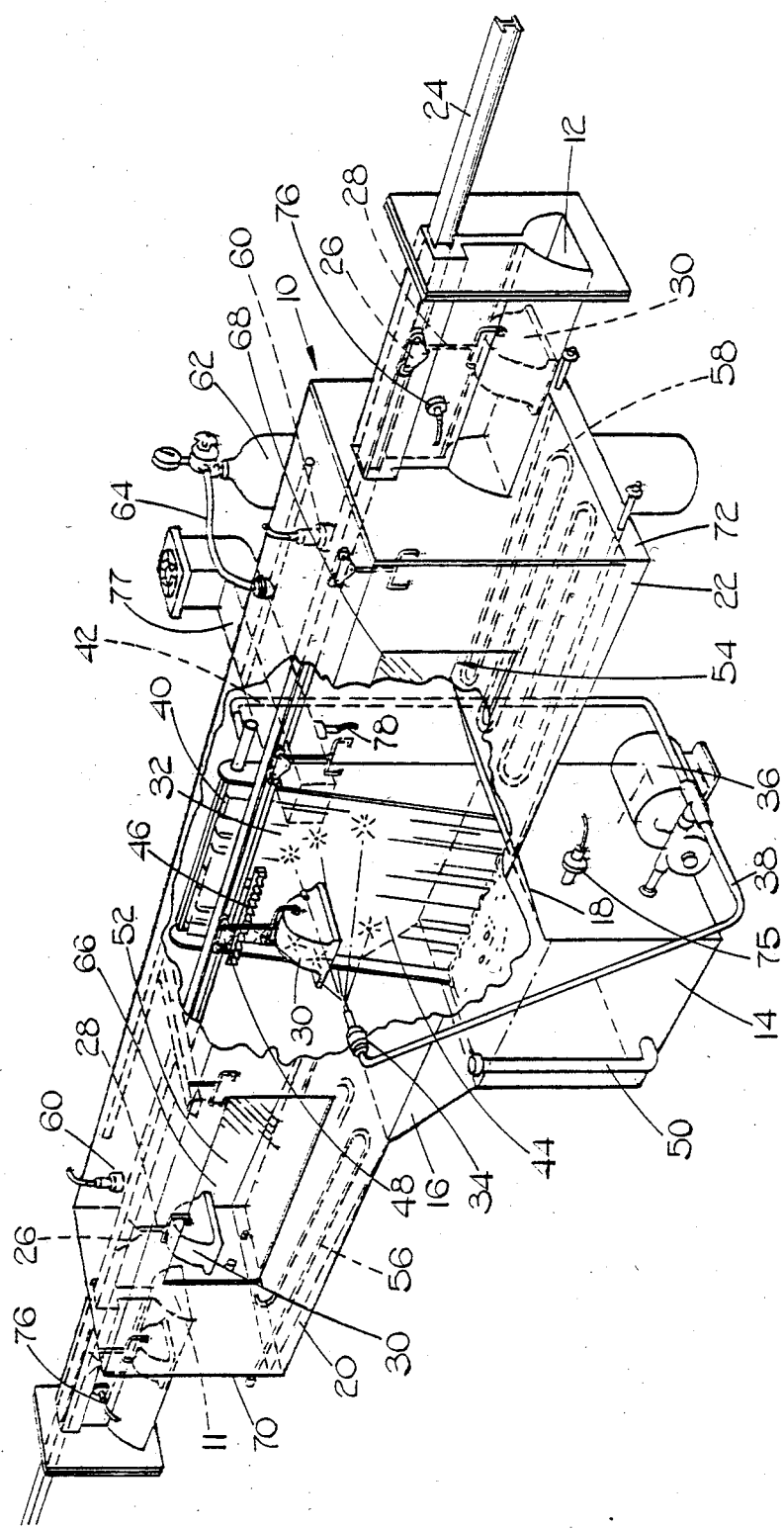

United States Patent [19]

Ankrett

[11] Patent Number: 4,600,608
[45] Date of Patent: Jul. 15, 1986

[54] SURFACE COATING APPARATUS AND METHOD

[75] Inventor: Dennis R. Ankrett, Birmingham, England

[73] Assignee: Lucas Industries, Birmingham, England

[21] Appl. No.: 433,422

[22] Filed: Oct. 8, 1982

[30] Foreign Application Priority Data

Oct. 17, 1981 [GB] United Kingdom ............... 8131388

[51] Int. Cl.⁴ .................... B05D 1/04; B05C 15/00
[52] U.S. Cl. .................................. 427/424; 118/61; 118/663; 118/712; 118/DIG. 7; 118/326
[58] Field of Search ............... 118/326, DIG. 7, 634, 118/61, 712, 663, 688; 427/424, 422

[56] References Cited

U.S. PATENT DOCUMENTS

| | | | |
|---|---|---|---|
| 2,734,479 | 2/1956 | Norris | 118/326 |
| 2,848,353 | 8/1958 | Norris | 118/61 X |
| 2,879,180 | 3/1959 | Page et al. | 118/326 X |
| 3,847,118 | 11/1974 | Ambry | 118/602 |
| 4,064,295 | 12/1977 | Singer | 427/424 |
| 4,265,642 | 5/1981 | Mir et al. | 55/85 |
| 4,344,381 | 8/1982 | Ostrowski et al. | 118/626 |

FOREIGN PATENT DOCUMENTS

| | | |
|---|---|---|
| 717021 | 1/1967 | Belgium . |
| 55536 | 7/1982 | European Pat. Off. . |
| 1116915 | 5/1956 | France . |
| 02843 | 9/1982 | PCT Int'l Appl. . |

*Primary Examiner*—John P. McIntosh
*Attorney, Agent, or Firm*—Ladas & Parry

[57] ABSTRACT

To reduce solvent wastage and the risk of pollution and explosions, articles to be surface coated (sprayed, flow coated or dip coated) are transported through a coating station disposed in a closed chamber having long inlet and outlet passages having the outline of said articles. Condensing regions are provided on opposite sides of the coating station to condense solvent vapor in the chamber. The arrangement in the chamber is such that the atmosphere is substantially saturated with solvent, the oxygen level is maintained below a predetermined level and only a small pressure difference is maintained between the pressures inside and outside the chamber to minimize escape of vapor.

10 Claims, 2 Drawing Figures

SURFACE COATING APPARATUS AND METHOD

This invention relates to an apparatus and method for surface coating articles by techniques such as spraying, flow coating or dipping. In particular, the invention is applicable to an apparatus and method for surface coating articles wherein the surface coating material is applied in a form in which it is dispersed in a solvent and/or diluent (hereinafter simply referred to as "solvent"). It is known to spray paint articles by passing them through a spraying booth and coating them using one or more spray nozzles. The paint composition may contain large quantities of solvent which present a fire and/or health hazard. In order to avoid a build up of dangerous concentrations of solvent, it is known to pass very large quantities of air through the spraying booth in order to purge the solvent which is removed through an exhaust hood and never recovered. Typically, a minimum of 60 cubic meters of air are passed through the spray booth per liter of solvent evaporated. Clearly, such a process is extremely wasteful both in energy and solvent costs since the solvent is totally lost to atmosphere. Also, particularly in the case of non-electrostatic paint spraying techniques, there is a relatively low paint utilization efficiency because any paint which does not adhere to tbe articles becomes deposited on surfaces in the spraying booth or exhausted to atmosphere and is lost. Periodically, the spraying booth has to be cleaned to remove deposited paint and this is also time consuming and disruptive in a continuous spraying operation.

Similar problems also apply to known techniques of flow coating and dipping where solvent which has evaporated is removed to prevent build up of undesirable solvent vapour concentrations.

U.S. Pat. No. 3,750,622 discloses an apparatus and method of spray coating articles in which articles to be spray coated are transported through a spray coating chamber and in which a fluid such as air is circulated in a closed loop path outside the coating chamber and is directed so as to form an air curtain across the entrance and exit openings of the coating chamber. Contaminants, such as atomised coating material and solvent, which escape from the coating chamber are picked up by the air curtain and passed along the closed loop path to a separator where the contaminants are separated from the circulating air and returned to a spray coating material reservoir. With such an arrrangement, there is a relatively large volumetric flow through the entrance and exit openings because there is a relatively high positive pressure in the chamber as a result of air being blown therein via the sprayers. This means that the closed loop will contain large volumes of air mixed with solvent and other combustibles, thus reducing safety levels. Also, whilst articles are passing through the entrance and exit openings the efficiency of the air curtain is deleriously affected, resulting in an increased risk of pollution of the environment around the apparatus. Further, the high flow velocity through the entrance and exit openings can dislodge the articles and can also lead to contamination of the articles with dirt.

It is an object of the present invention to obviate or mitigate the above disadvantages.

According to one aspect of the present invention, there is provided apparatus for surface coating articles comprising a closed chamber having an inlet for articles to be surface coated and an outlet for articles which have been surface coated; means for transporting the articles through the closed chamber from the inlet to the outlet; a coating station in the chamber through which articles are transported in use to be surface coated; means for supplying a surface coating composition containing a coating material and a solvent (as herein defined) to said coating station; and means for collecting solvent within the chamber; the arrangement being such that, in use, an atmosphere is maintained in the closed chamber which is substantially saturated with said solvent and in which oxygen is maintained below a predetermined level.

With such an arrangement, the whole system can be run at substantially atmospheric pressure compared with external ambient pressure so that leakage to atmosphere tbrough the inlet and the outlet can be minimised. Also, the ratio of oxygen to combustibles in the chamber can be maintained below the explosive range.

Preferably, the collecting means includes means for condensing solvent vapour.

In a highly preferred embodiment, a reservoir is provided for collecting solvent and excess coating composition.

To limit leakage of air into the chamber and leakage of vapour out of the chamber through the inlet and the outlet, it is preferred to provide the inlet and the outlet as respective passages having a cross-sectional shape which corresponds to but is slightly larger than the outline of the articles so that, in use, there is only a minimum clearance between the wall of the respective passage and the article, each inlet and outlet passage being of a length such that, in use, there will always be at least one article in the passage. In this way, an effective seal can be provided which not only limits leakage of air into the chamber but also can limit leakage of vapour out of the chamber. However, the sealing may be further enhanced by providing additional sealing means either in the form of a mechanical seal or a gas curtain across the opening(s) to the inlet and/or outlet passages.

Preferably, means are provided for feeding an inert (i.e., non reactive) gas into the chamber.

Means may be provided for sensing the oxygen level, the temperature and the vapour concentration in the chamber.

In a preferred embodiment, means are provided for condensing solvent at locations which are disposed upstream and downstream of the coating station within the chamber.

According to another aspect of the present invention, there is provided a method of surface coating articles comprising the steps of transporting articles to be surface coated through a closed chamber from an inlet to an outlet thereof, surface coating said articles at a coating station in the chamber using a surface coating composition containing a coating material and a solvent (as herein defined), collecting solvent in the chamber, and maintaining an atmosphere in the chamber which is substantially saturated with said solvent and in which oxygen is maintained below a predetermined level.

Figure 2:
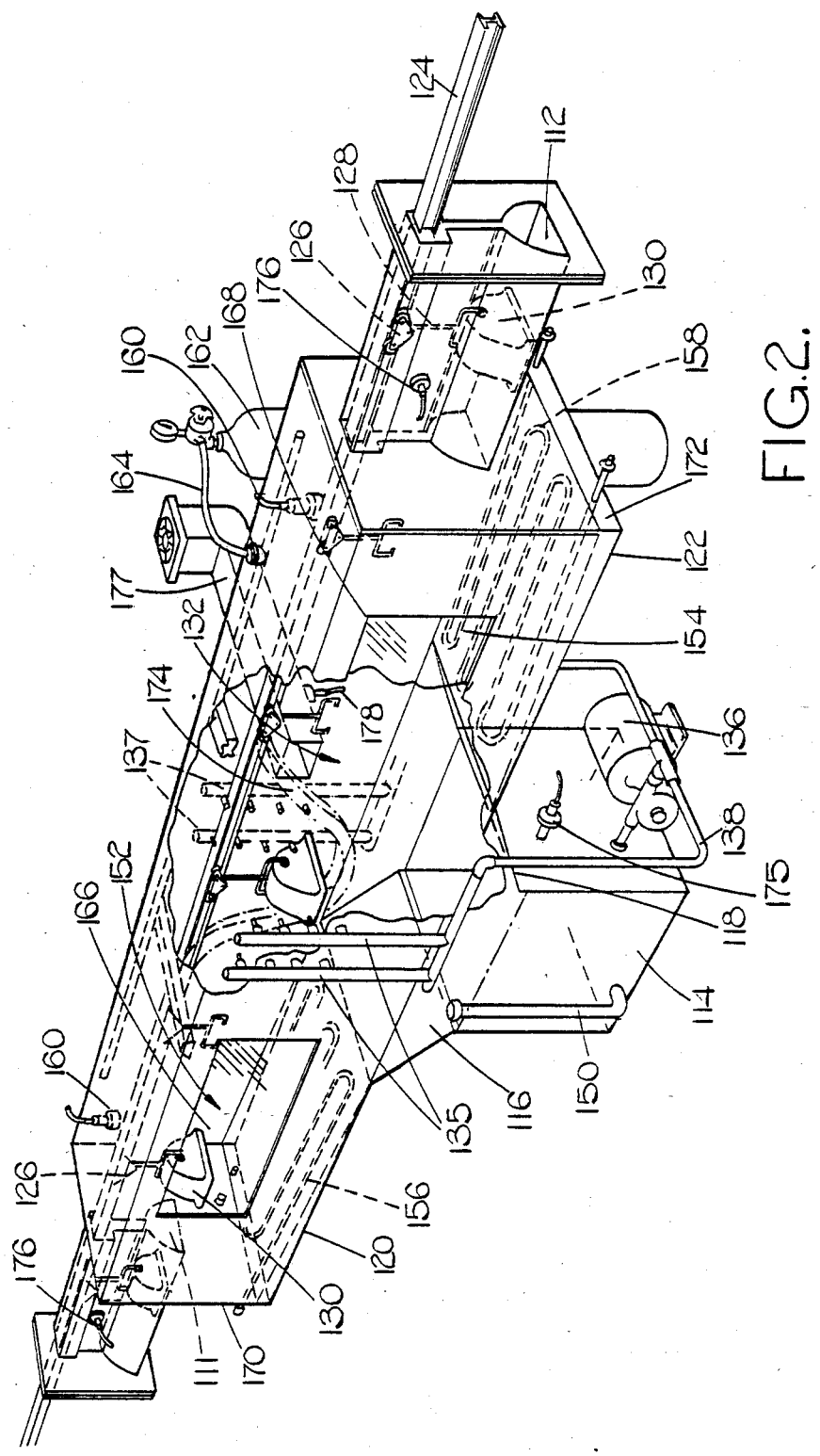

Embodiments of the present invention will now be described, by way of example, with reference to the accompanying drawings, in which:

FIG. 1 is a schematic, partly cut-away perspective view of one embodiment of surface coating apparatus according to the present invention, and FIG. 2 is a schematic, partly cut-away perspective view of another form of surface coating apparatus according to the present invention.

Referring now to FIG. 1, the apparatus illustrated therein is for spray painting and comprises a closed chamber indicated generally by arrow 10. The chamber 10 has an inlet passage 11 at one end thereof and an outlet passage 12 at an opposite end thereof. Between the inlet and outlet passages 11 and 12, the chamber 10 is of generally rectangular box like structure with a reservoir 14 projecting from a lower surface thereof. The reservoir 14 opens upwardly into the rectangular box like section of the chamber 10 and is provided with inclined upstream and downstream side walls 16 and 18. The side walls 16 and 18 are joined to respective upstream and downstream floor portions 20 and 22 which are themselves inclined slightly downwardly towards the centrally located reservoir 14. A track 24 in the form of an I-section rail extends completely through the chamber 10 including the inlet and outlet passages 11 and 12 respectively. Movable carriages 26 are provided on the track and carry hangers 28 which grip and hold articles 30 to be paint sprayed. The carriages 26 are linked together by a driven line (not shown) to enable the articles 30 to be transported through the chamber 10 via the inlet and outlet passages 11 and 12. As can be seen from the drawing, the cross-sectional shape of the inlet and outlet passages 11 and 12 corresponds closely to the outline of the articles 30 when carried by the hangers 28 so that there is only a minimum clearance between the wall of the passage 11, 12 and the article 30 suspended from the carriage 26 by hanger 28. The track 24, carriers 26, hangers 28 and driven line together constitute a means for transporting the articles through the chamber. Disposed at a central portion of the chamber 10 above the reservoir 14 is an airless spray painting station indicated generally by arrow 32. At the station 32 is a paint spraying nozzle which is supplied with paint in the reservoir 14 by a pump 36 via a supply line 38. The nozzle 34 is disposed on one side of the path of movement of the articles 30 whilst on the opposite side there is disposed a pipe 40 having a row of orifices therethrough. The pipe 40 is connected with the pump 36 via a supply line 42 so that, in operation, a curtain 44 of paint is established in the station 32 opposite the spray nozzle 34. Also disposed in the station 32 is a fixed rack 46 with which pinions 48 secured to the hangers 28 co-operate. The hangers 28 are rotatable about a vertical axis relative to the carriages 26 so that the articles 30 are rotated about a vertical axis during passage through the station 32 so that they can be completely covered with paint sprayed from the nozzle 34. A sight tube 50 is provided for monitoring the level of paint in the reservoir 14. Although not shown in the drawing, the upstream and downstream sides of the station 32 are limited by upstream and downstream walls having apertures therethrough of a similar shape to that of the inlet and outlet passages 11 and 12 to allow passage of the articles 30 therethrough. These walls terminate just above the respective floor portions 20 and 22 and serve to define respective downstream and upstream end portions of solvent condensation regions 52 and 54, respectively. Tubes 56 and 58 are provided just above the respective floor portions 20 and 22 within the regions 52 and 54 and, in use chilled water is passed through these tubes 56 and 58 to effect condensation of solvent. Solvent which has been condensed by contact with the tubes 56 and 58 is deposited on the inclined floor portions 20 and 22 and drains back into the reservoir 14.

In use, the separation of the articles 30 on the track 24 and the length of the inlet and outlet passages 11 and 12 are chosen so that at any time there is always at least one article 30 in each of the inlet and outlet passages 11 and 12. This provides a reasonably effective seal to prevent unwanted admission of air into the chamber 10. However, oxygen sensors 60 are provided in the solvent condensation regions 52 and 54 for monitoring the oxygen level so as to ensure that the ratio of oxygen to combustibles is below the explosive range. A cylinder 62 is provided for supplying inert (non-reactive) gas e.g. nitrogen, into the chamber 10 via a line 64. Supply of the inert gas into the chamber 10 can be controlled in response to signals from the oxygen sensors 60 and/or a differential pressure transducer 78 referred to hereinafter. It will be appreciated that paint which issues from the nozzle 34 and which does not impinge against article 30 in the station 32 will enter the paint curtain 44 and be recycled back to the reservoir 14. Solvent vapour saturates the chamber 10 and is condensed by the tubes 56 and 58 to be returned to the reservoir 14 as described above so that there is very little net loss of solvent. A sensor (not shown) is provided for monitoring the viscosity of the paint in the reservoir 14 and for periodically supplying fresh paint of a suitable viscosity so as to maintain the paint in the reservoir at the required viscosity for spraying. A heater (not shown) is provided in the reservoir 14 to maintain the temperature of the paint thereon substantially constant thereby aiding the viscosity control employed, since it will be appreciated that, without the heater the temperature of the paint within the reservoir may vary due to the chilling effect on the solvent due to the condensing means.

Inspection windows 66 and 68 are provided in the chamber 10 for inspecting the solvent condensing regions 52 and 54 and a further window (not shown) is provided for enabling inspection of the station 40.

The inlet and outlet passages 11 and 12 are mounted on detachable end plates 70 and 72, respectively for ease of cleaning and to facilitate the replacement of the inlet and outlet passages by other shapes of inlet and outlet passage when articles having a different shape are to be spray painted.

A temperature sensor 75 is provided in the reservoir 14 for sensing the temperature of the paint so that the temperature of the paint can be controlled to assist in obtaining the required viscosity. Gas/vapour detectors 76 are provided in the inlet and outlet passages 11 and 12. A low volume gas/vapour extractor system 77 is provided for creating a slight negative pressure (e.g. about 6-7 KPa below the atmospheric pressure which exists outside the chamber and is detected with respect to atmospheric pressure by the differential pressure transducer 78) in the region of the station 40 so as to promote a general flow of solvent away from the inlet and outlet passages 11 and 12 while allowing the introduction of inert gas to balance the negative pressure. In the extraction system 77, the small amounts of inert gas and solvent which are removed are recovered and recycled.

Flameproof lights (not shown) are provided in the roof of the chamber 10 in the regions 52 and 54 to facilitate inspection.

Because of the saturation and inert nature of the atmosphere within the closed chamber 10, there is virtually no risk of paint drying on the internal surfaces of the chamber 10 and so any paint which does become deposited on the internal surfaces can continue to flow and be returned to the reservoir 14 so that there is very little wastage of paint. There is also very little risk of explosion in the chamber 10 because of the virtual exclusion of oxygen therefrom.

Referring now to FIG. 2, the apparatus illustrated therein is basically very similar to that of FIG. 1 and corresponding parts are accorded the same reference numerals in the 100 series and for convenience their construction and operation will not be described again. In this embodiment, however, station 132 is arranged for flow coating articles 130. For this purpose, pipe 138 is used to supply paint to two pairs of orificed tubes 135 and 137 disposed on opposite sides of the path of movement of the articles 130 through station 132. The orificed tubes 135 and 137 serve to flow coat the articles 130 in a manner known per se in the flow coating art. Excess paint falls back into the reservoir 114.

In an alternative embodiment, track 124 is curved downwardly as shown in chain dot line in the region of arrow 174 to enable the articles 130 to be dip coated in the paint contained in the reservoir 114 in such alternative embodiment, the orificed tubes 135 and 137 and associated paint supply pipes 138 and pump 136 can be dispensed with.

Apart from the above mentioned differences, the apparatus of FIG. 2 operates in the same way as that of FIG. 1.

In starting a painting operation using the apparatus of FIGS. 1 and 2, the whole chamber 10, 110 is purged with inert gas, e.g. nitrogen, until oxygen sensors 60, 160 detects an oxygen level of not greater than of the order of 5% by volume. Then, the painting operation can be started without risk of explosion.

Since the overall process is run at substantially atmospheric pressure the losses of solvent from the chamber are minimised and atmospheric pollution and the risk of explosion are minimised.

The gas/vapour sensors and the oxygen sensors can be connected to any desired monitoring and controlling equipment e.g. a DRAEGER OXYTRON 30ID available from Draeger Safety Group Ltd., UK or a GMA 030 available from Gesellschaft fuer Geraetebau mbH & Co., KG, Germany.

It will be appreciated that the apparatus according to the present invention is suitable for the application of coatings other than paint coatings in situations where the coating is dissolved or dispersed in a volatile organic solvent, dispersant and/or diluent. Typical organic solvents are xylenes, alcohol (e.g. butyl alcohol) and ketones (e.g. methyl isobutyl ketone).

Although, in the above-described embodiments, sealing of the chamber is effected by providing inlet and outlet passages of similar shape to that of the articles passing therethrough, with or without additional mechanical or gas curtain sealing means across their respective openings, it is within the scope of the invention, especially with small articles, to dispense with such passages and provide the end walls of the chamber with seals which could be of mechanical form or an air lock seal arrangement, or gas curtains.

I claim:

1. Apparatus for surface coating articles comprising a closed chamber having an inlet for articles to be surface coated and an outlet for articles which have been surface coated; means for transporting the articles through said closed chamber from said inlet to said outlet; a coating station in said chamber through which articles are transported in use to be surface coated; means for supplying a surface coating composition containing a coating material and a solvent to said coating station; an inert gas source; means for feeding inert gas from said source into said chamber; a reservoir opening into said chamber; means for collecting (a) solvent from said coating composition and (b) excess coating composition in said reservoir, the arrangement being such that, in use, an atmosphere is maintained in the closed chamber which is substantially saturated with said solvent and in which oxygen is maintained below a predetermined level;

means for creating a localized negative pressure in the chamber at at least one location, said negative pressure being sufficient to encourage a general flow of vapour away from at least one of said inlet and said outlet; and a differential pressure transducer for comparing atmospheric pressure with said localized negative pressure and causing introduction of inert gas when a pressure difference is detected.

2. The apparatus according to claim 1, wherein said collecting means includes means in the chamber for condensing solvent vapour.

3. The apparatus according to claim 1, wherein said inlet and said outlet are formed as respective passages having a cross-sectional shape which corresponds to but is slightly larger than the outline of the articles so that, in use, there is only a minimum clearance between the wall of the respective passage and the article, each inlet and outlet passage being of a length such that, in use, there will always be at least one article in the passage.

4. The apparatus according to claim 1, wherein said means for creating a localised negative pressure comprises an extractor disposed in the region of said caoting station.

5. The apparatus according to claim 1, wherein means are provided for condensing solvent vapour at locations which are disposed upstream and downstream of said coating station within the chamber.

6. Apparatus according to claim 1 where in addition to said differential pressure transducer, oxygen sensors are provided and an introduction of inert gas is controlled in response to signals from the oxygen sensors and said differential pressure transducers.

7. A method of surface coating articles comprising the steps of transporting articles to be surface coated through a closed chamber from an inlet to an outlet thereof, surface coating said articles at a coating station in the chamber using a surface coating composition containing a coating material and a solvent, collecting (a) solvent from said coating composition and (b) excess coating composition in a reservoir opening into said chamber, and maintaining an atmosphere in the chamber which is substantially saturated with said solvent and in which oxygen is maintained below a predetermined level, providing means for creating a localized negative pressure in the chamber at at least one location, said negative pressure being sufficient to encourage a general flow of vapour away from at least one of said inlet and said outlet and providing a differential pressure transducer for comparing atmospheric pressure with said localized negative pressure and causing introduction of inert gas when a pressure difference is detected.

8. Method according to claim 7 where in addition to said differential pressure transducer, oxygen sensors are provided and an introduction of inert gas is controlled in response to signals from the oxygen sensors and said differential pressure transducers.

9. Apparatus for surface coating articles comprising a closed chamber having an inlet for articles to be surface coated and an outlet for articles which have been surface coated; means for transporting the articles through said closed chamber from said inlet to said outlet; a coating station in said chamber through which articles are transported in use to be surface coated; means for supplying a surface coating composition containing a coating material and a solvent to said coating station; an inert gas source; means for feeding inert gas from said source into said chamber; a reservoir opening into said chamber; means for collecting (a) solvent from said coating composition and (b) excess coating composition in said reservoir, the arrangement being such that, in use, an atmosphere is maintained in the closed chamber which is substantially saturated with said solvent and in which oxygen is maintained below a predetermined level;

means for creating a localized negative pressure in the chamber at at least one location, said negative pressure being sufficient to encourage a general flow of vapour away from at least one of said inlet and said outlet; and oxygen sensors are provided for controlling an introduction of inert gas in response to signals from said oxygen sensors.

10. A method of surface coating articles comprising the steps of transporting articles to be surface coated through a closed chamber from an inlet to an outlet thereof, surface coating said articles at a coating station in the chamber using a surface coating composition containing a coating material and a solvent, collecting solvent in the chamber, and maintaining an atmosphere in the chamber which is substantially saturated with said solvent and in which the oxygen is maintained below a predetermined level, providing means for creating a localized negative pressure in the chamber at at least one location, said negative pressure being sufficient to encourage a general flow of vapor away from at least one of said inlet and said outlet and providing oxygen sensors and causing introduction of inert gas in response to signals from said oxygen sensors.

* * * * *